United States Patent
Zou et al.

(10) Patent No.: US 7,997,816 B2
(45) Date of Patent: Aug. 16, 2011

(54) PORTABLE TERMINAL WITH KEYPAD LIFTING MECHANISM

(75) Inventors: Zhi-Gang Zou, Shenzhen (CN); Zhi-Gang Peng, Shenzhen (CN); Zhi-Lan Chen, Shenzhen (CN); Tao Yin, Shenzhen (CN); Zhi-Qiang Shi, Shenzhen (CN)

(73) Assignees: Shenzhen Futaihong Precision Industry Co., Ltd., ShenZhen,Guangdong Province (CN); FIH (Hong Kong) Limited, Kowloon (HK)

( * ) Notice: Subject to any disclaimer, the term of this patent is extended or adjusted under 35 U.S.C. 154(b) by 306 days.

(21) Appl. No.: 12/484,317

(22) Filed: Jun. 15, 2009

(65) Prior Publication Data

US 2010/0014236 A1     Jan. 21, 2010

(30) Foreign Application Priority Data

Jul. 16, 2008   (CN) .......................... 2008 1 0302758

(51) Int. Cl.
*G06F 3/023* (2006.01)
(52) U.S. Cl. ...................................................... 400/472
(58) Field of Classification Search .................. 400/472, 400/480, 481, 488, 489, 713, 714; 455/550.1, 455/566, 90.3, 575.1; 361/679.11–679.16; 379/433.01, 433.04
See application file for complete search history.

(56) References Cited

U.S. PATENT DOCUMENTS

| | | | | | |
|---|---|---|---|---|---|
| 5,519,570 A | * | 5/1996 | Chung | ........................... | 400/472 |
| 5,532,904 A | * | 7/1996 | Sellers | ........................... | 400/490 |
| 5,635,928 A | * | 6/1997 | Takagi et al. | ............ | 361/679.13 |
| 5,793,311 A | * | 8/1998 | Wood | ............................. | 200/181 |
| 5,933,320 A | * | 8/1999 | Malhi | ....................... | 361/679.16 |
| 5,933,812 A | * | 8/1999 | Meyer et al. | ............. | 361/679.26 |
| 5,948,360 A | * | 9/1999 | Rao et al. | ......................... | 422/65 |
| 5,971,637 A | * | 10/1999 | Malhi et al. | ............... | 361/679.13 |
| 6,091,600 A | * | 7/2000 | Jeong | ....................... | 361/679.12 |
| 6,808,328 B1 | * | 10/2004 | Gully | ............................ | 400/472 |
| 6,894,626 B2 | * | 5/2005 | Olodort et al. | ................ | 400/472 |
| 6,991,389 B2 | * | 1/2006 | Mochizuki et al. | ........... | 400/472 |
| 7,286,862 B2 | * | 10/2007 | Lee et al. | .................... | 455/575.4 |
| 2003/0059242 A1 | * | 3/2003 | Horiuchi et al. | .............. | 400/489 |
| 2004/0027335 A1 | | 2/2004 | Lin | | |
| 2004/0126170 A1 | * | 7/2004 | Hagerman | ..................... | 400/472 |
| 2005/0245297 A1 | | 11/2005 | Lee et al. | | |
| 2008/0039159 A1 | * | 2/2008 | Joo et al. | .................... | 455/575.4 |
| 2008/0075515 A1 | * | 3/2008 | Large | ............................ | 400/472 |
| 2008/0090627 A1 | * | 4/2008 | Jeong et al. | ................ | 455/575.4 |

FOREIGN PATENT DOCUMENTS

| | | |
|---|---|---|
| EP | 1638298 A2 | 3/2006 |
| EP | 1667408 A1 | 6/2006 |
| WO | 2008074358 A1 | 6/2008 |

* cited by examiner

*Primary Examiner* — Briggitte R Hammond
(74) *Attorney, Agent, or Firm* — Altis Law Group, Inc.

(57) ABSTRACT

A keypad lifting mechanism includes a first board, a guiding piece, a second board and a third board. The guiding piece defines a guiding hole. The guiding hole includes a transverse end portion. The second board includes at least one protrusion. A guiding post is formed on the second board for engaging in the guiding hole of the guiding piece. The third board includes at least one slope corresponding to the at least one protrusion. When the guiding piece is pushed away from the third board, the guiding post slides along the guiding hole of the guiding piece. The second board moves with the guiding piece when the guiding post reaching the transverse end portion of the guiding hole. The third board is raised by the at least one slope sliding up along the at least one protrusion of the second board.

20 Claims, 7 Drawing Sheets

PORTABLE TERMINAL WITH KEYPAD LIFTING MECHANISM

This application is related to co-pending U.S. patent application Ser. Nos. 12/483,324 and 12/484,320, all entitled "PORTABLE TERMINAL WITH KEYPAD LIFTING MECHANISM". Such applications have the same assignee as the present application. The above-identified applications are incorporated herein by reference.

BACKGROUND

1. Technical Field

The present disclosure relates to portable terminals, particularly, to a keypad lifting mechanism and a portable terminal therein.

2. Description of Related Art

Sliding-type terminals have recently appeared in electronic devices to satisfy users' various tastes for improved portability and convenience. For example, in mobile phones, a conventional sliding-type terminal has a first housing and a second housing adapted to linearly reciprocate to be opened or closed. A display device is arranged in one of the housings. A keypad is fixed in the other housing. The keypad can be exposed or hidden by sliding one of the housings. However, with this configuration, the keypad is recessed relative to the sliding housing. Such structure may cause inconvenience to the users.

Therefore, there is room for improvement within the art.

BRIEF DESCRIPTION OF THE DRAWINGS

Many aspects of the keypad lifting mechanism can be better understood with reference to the following drawings. The components in the drawings are not necessarily drawn to scale, the emphasis instead being placed upon clearly illustrating the principles of the keypad lifting mechanism, in which.

DETAILED DESCRIPTION OF THE EMBODIMENTS

Figure 1:
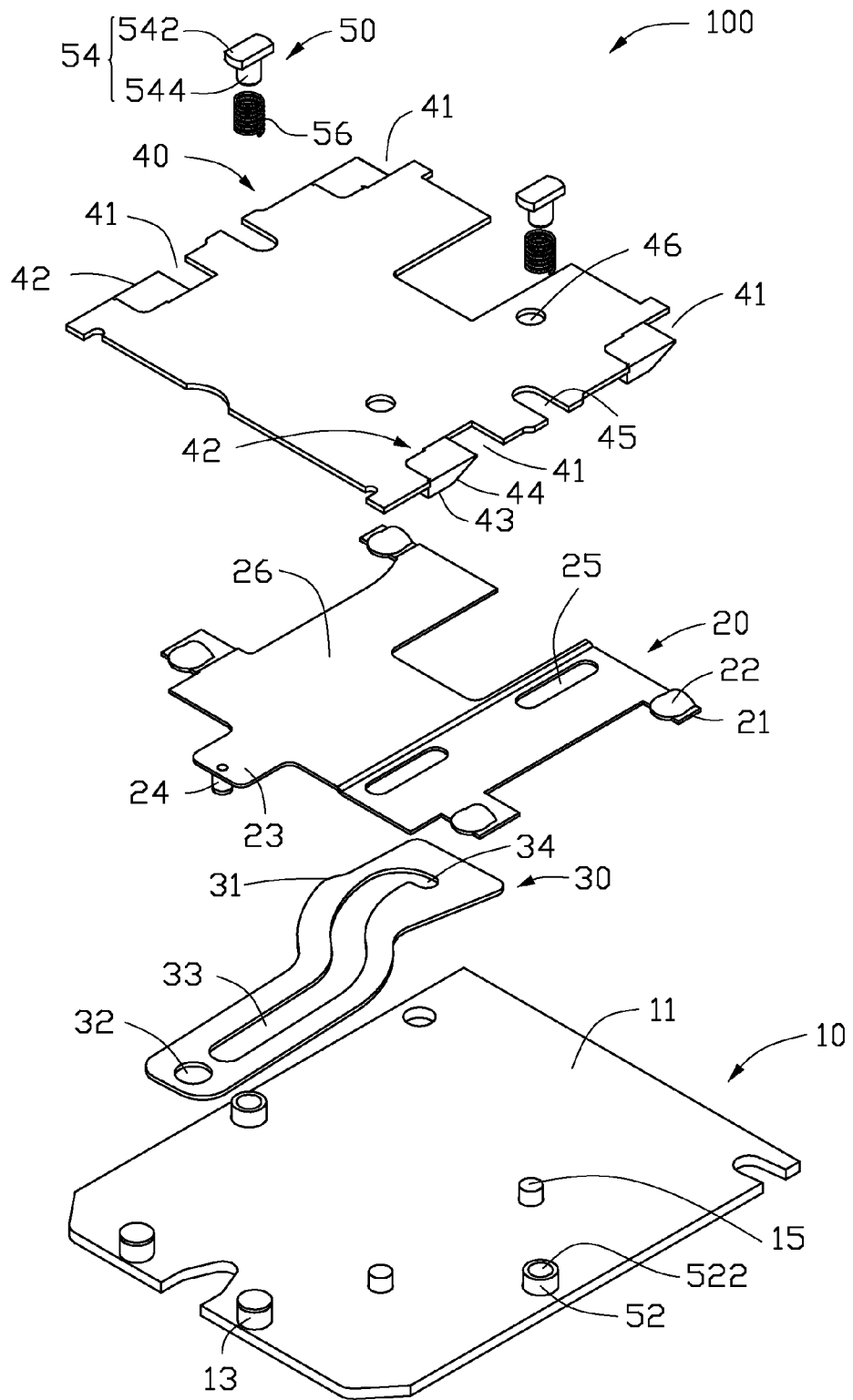
FIG. 1 is an exploded, schematic view of a keypad lifting mechanism, in accordance with an exemplary embodiment.
Figure 2:
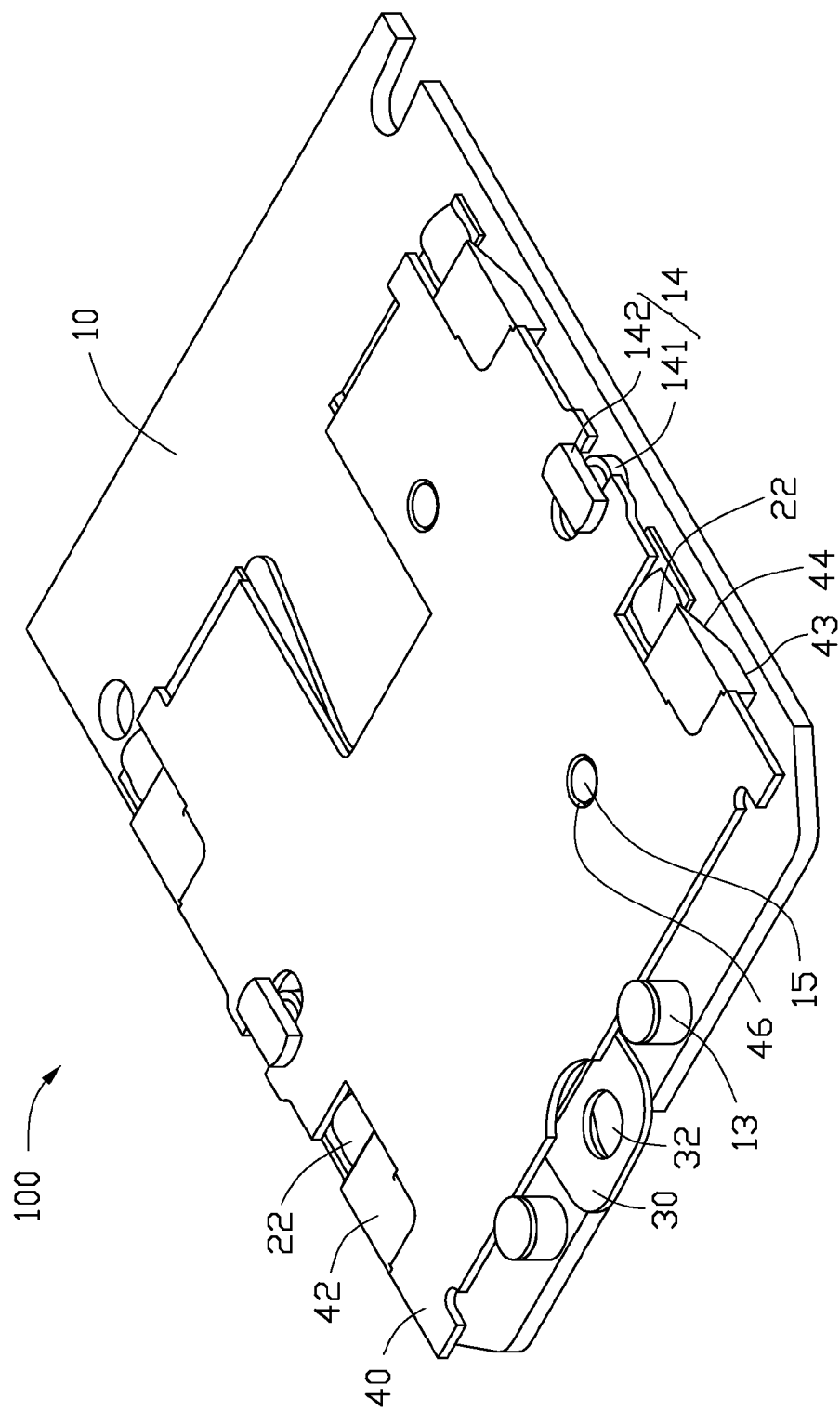
FIG. 2 is an assembled, schematic view of the keypad lifting mechanism shown in FIG. 1.

Referring to FIG. 1, a keypad lifting mechanism 100 is applied to a portable terminal 300 (shown in FIG. 6), in accordance with an exemplary embodiment. The keypad lifting mechanism 100 includes a first board 10, a second board 20, a guiding piece 30, a third board 40 and two locking modules 50.

The first board 10 has two guiding columns 13 and two positioning posts 15. The two guiding columns 13 are spacely positioned at one end of the first board 10. The two positioning posts 15 are spaced apart and positioned on opposite surfaces of the first board 10.

The second board 20 includes a main body 26. A wing 21 is formed at each corner of the main body 26. A protrusion 22 is formed on each wing 21. The main body 26 defines two sliding holes 25 configured for allowing the corresponding positioning posts 15 to slide along. An extending portion 23 extends from one end of the main body 26. A guiding post 24 is formed beneath the extending portion 23.

The guiding piece 30 is curved in shape and has a swerving portion 31. A through hole 32 is defined at one end of the guiding piece 30. A guiding hole 33 is defined in the guiding piece 30, for allowing the guiding post 24 to slide along. The guiding hole 33 has a transverse end portion 34 for stopping the guiding post 24 from moving further.

The third board 40 defines two positioning holes 46 for engaging with the positioning posts 15 of the first board 10. Each side of the third board 40 has two wedges 42 corresponding to the protrusions 22 of the second board 20. Each wedge 42 has a flat surface 43 and a slope 44 connecting with the flat surface 43. A first cutout 41 is defined next to each wedge 42 for receiving the protrusion 22. A second cutout 45 is defined at each side of the first board 10 between the two wedges 42, for allowing the locking module 50 to extend through. The second cutouts 45 are U-shaped.

The two locking modules 50 are positioned at opposite edges of the keypad lifting mechanism 100. Each locking module 50 includes a sleeve 52, a spring 56 and a locking member 54. Each sleeve 52 is positioned at one edge of the first board 10. Each sleeve 52 has a receiving hole 522 for receiving the spring 56. The locking member 54 has a head 542 and a shaft 544 extending from a bottom surface of the head 542.

Figure 3:
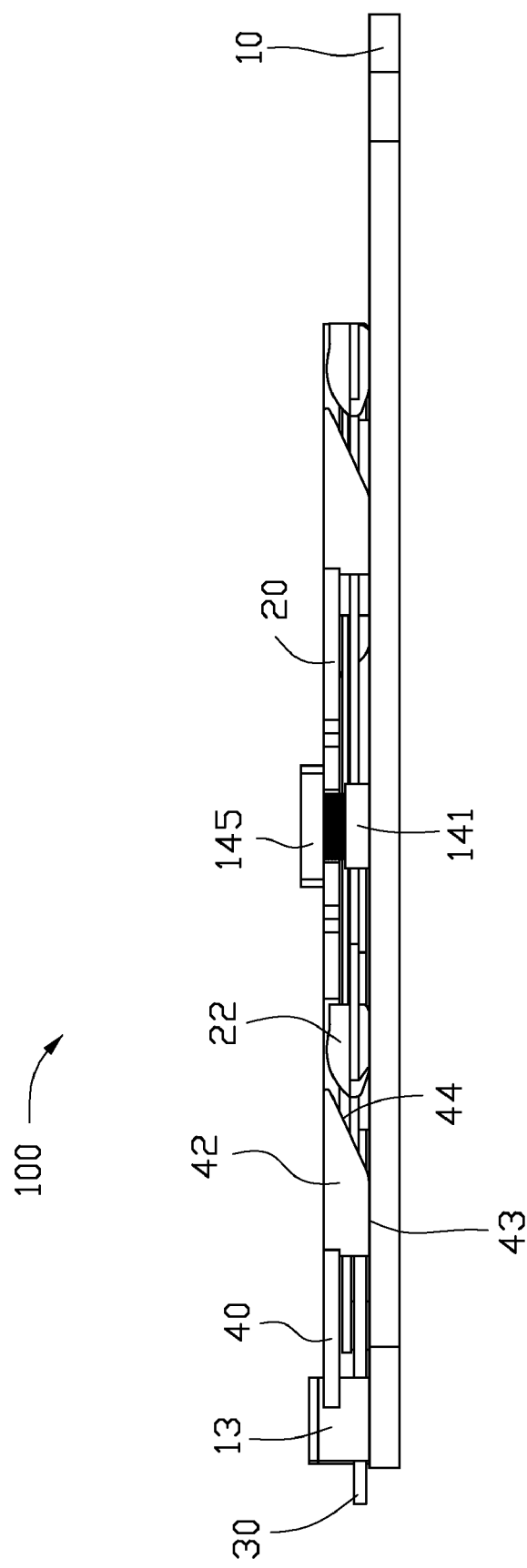
FIG. 3 is a cut-away view of FIG. 2.

When assembling the keypad lifting mechanism 100, also referring to FIG. 3, each spring 56 is mounted on the shaft 544 with one end fixed to the head 542 and another end fixed to a bottom surface of the sleeve 52. The head 542 of each locking member 54 is perpendicular to the second cut out 45 of the assembled third board. The guiding piece 30 is put on the first board 10, positioned between the two guiding columns 13. The second board 20 is then put on the guiding piece 30. The guiding post 24 is received in the guiding hole 33 and the positioning posts 15 respectively extend through the sliding holes 25. The locking modules 50 extend through the second board 20 via the space between the two wings 21 at each side of the second board 20. The third board 40 is attached to the second board 20, with the wedges 42 corresponding to the protrusions 22 of the second board 20. Each protrusion 22 is partly received in the first cutout 41 and partly touches the slope 44 of the corresponding wedge 42. The end of each positioning post 15 is engaged in the corresponding positioning hole 46 after extending through the sliding hole 25. The head 542 of each locking member 54 with the spring 544 is rotated to extend from the second cutout 45. When the pressure on the locking members 54 is released, the spring 56 forces the locking member 54 to rebound to original shape and the heads 542 are locked on the third board 40.

Figure 4:
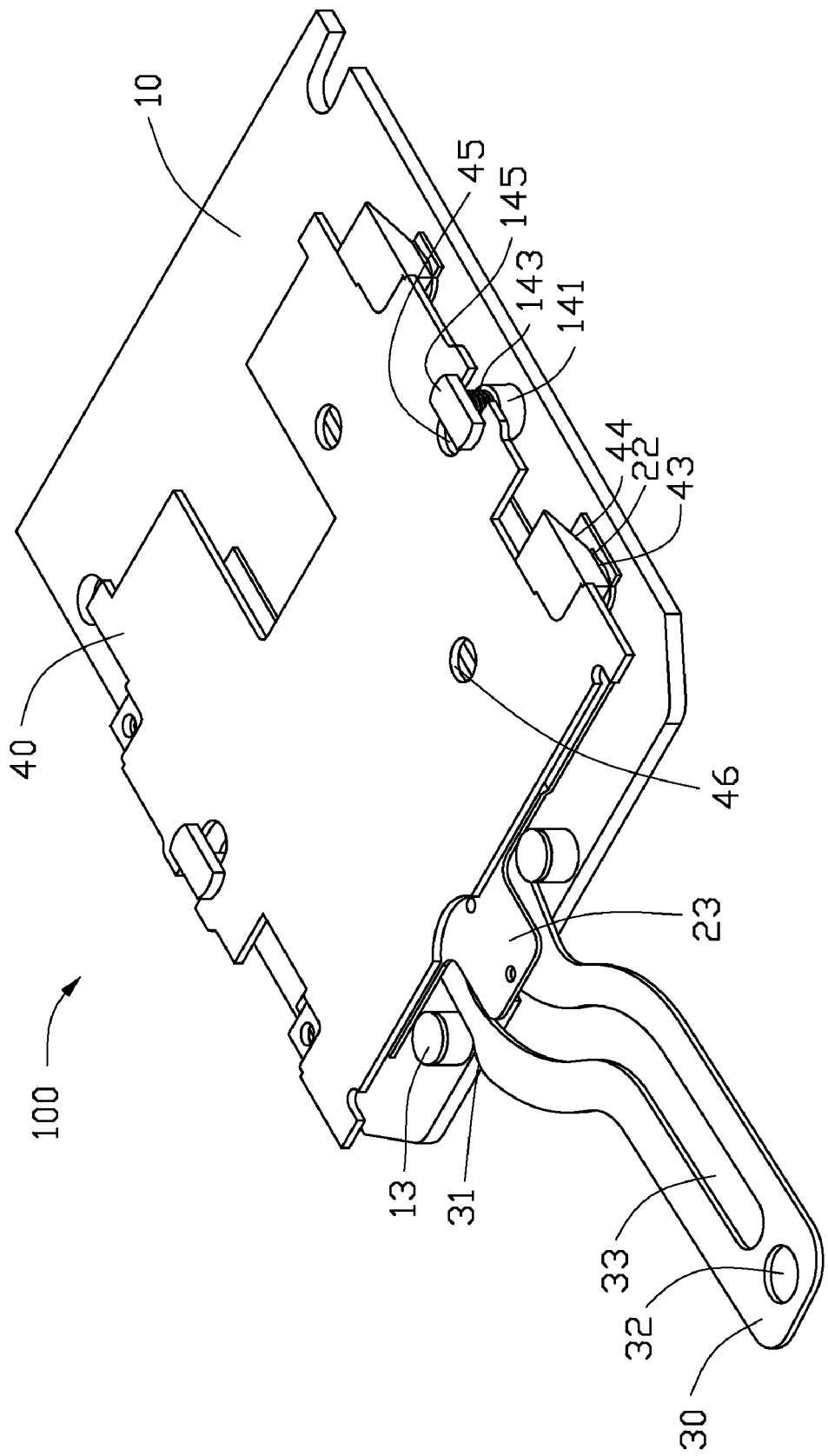
FIG. 4 is similar to FIG. 2, but showing a guiding piece of the keypad lifting mechanism pushed out.
Figure 5:
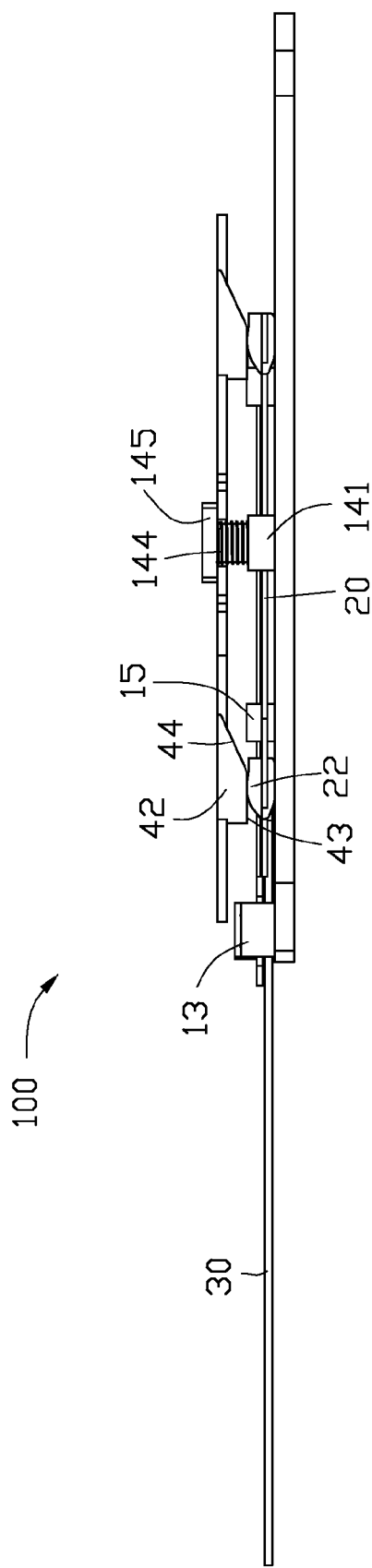
FIG. 5 is a cut-away view of FIG. 4.

In use, referring to FIGS. 4-5, the guiding piece 30 is pushed away from the third board 40. The guiding piece 30 slides along the two guiding columns 13, while the guiding post 24 slides along the guiding hole 33 of the second board 20. When the guiding columns 13 reach the swerving portion 31 of the guiding piece 30, the guiding post 24 is turned into the transverse end portion 34 of the guiding hole 33. The guiding piece 30 is further pushed away from the third board 40, and the second board 20 is moved with the guiding piece 30 via the guiding post 24 resisting the guiding piece 30 in the transverse end portion 34. The positioning posts 15 respectively slide along the sliding holes 25 until reaching ends of the sliding holes 25. The slopes 44 of the third board 40 respectively slide up along the protrusion 22. Thus, the third board 40 is raised relative to the second board 20. At the same time, the springs 56 are deformed. The third board 40 is in steady state when the flat surface 43 of the wedge 42 is situated on the protrusion 22.

Figure 6:
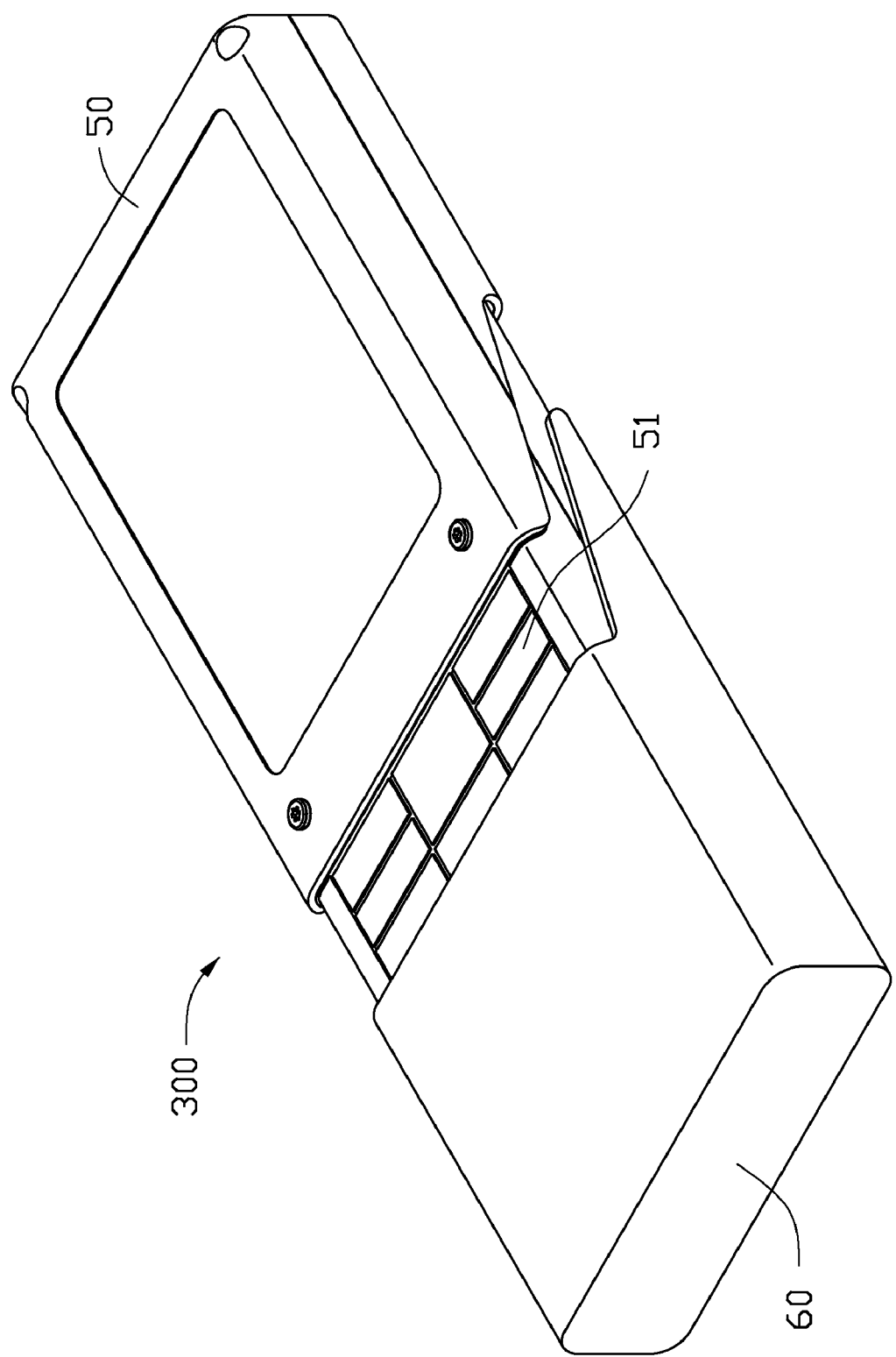
FIG. 6 is a schematic view of a portable terminal in cooperating with the keypad lifting mechanism shown in FIG. 1.
Figure 7:
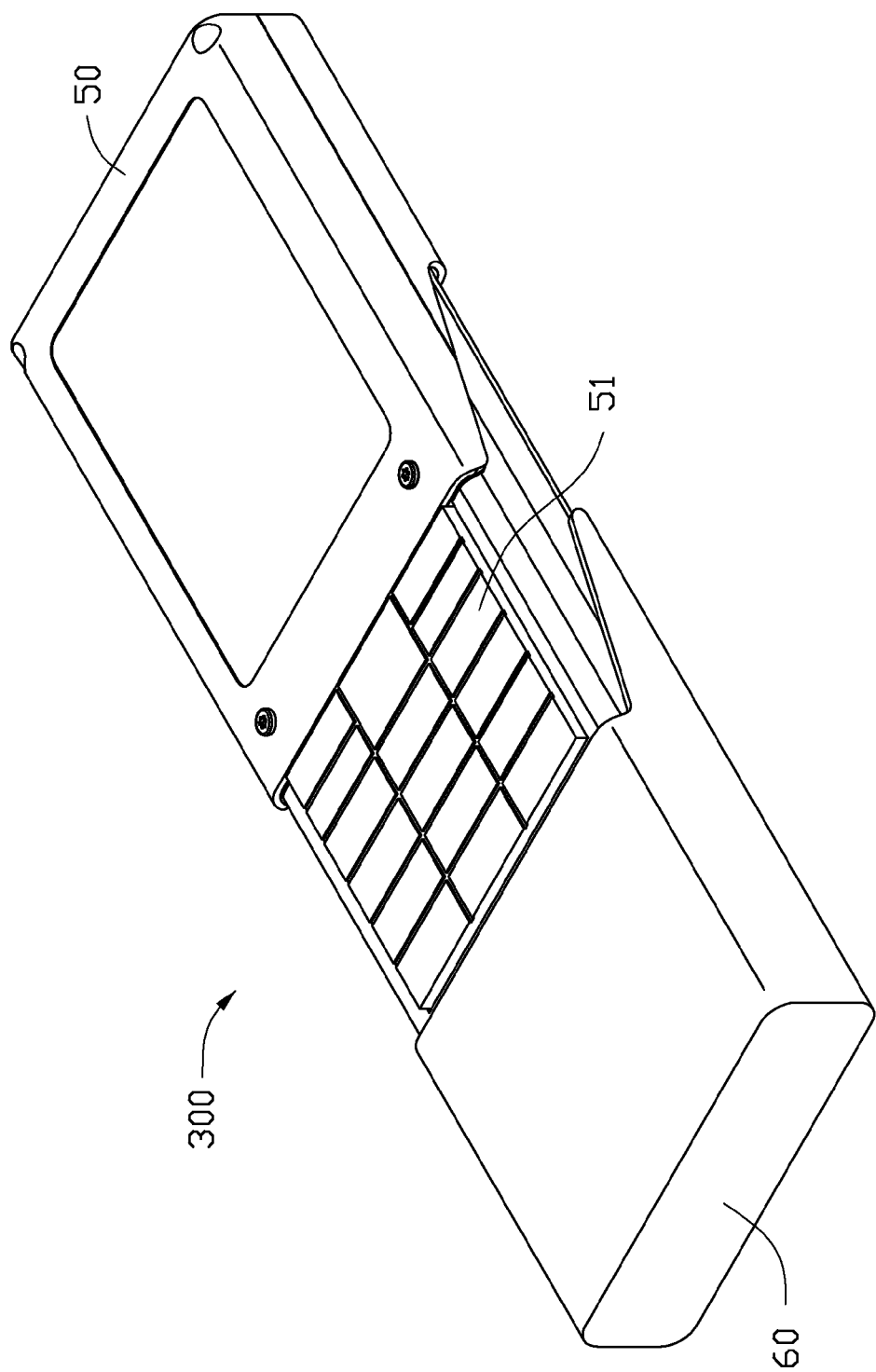
FIG. 7 is similar to FIG. 6, but showing a keypad of the portable terminal raised up.

Referring to FIGS. 6-7, the portable terminal 300 with the keypad lifting mechanism 100 therein further includes a first housing 50, a second housing 60 and a keypad 51. The first housing 50 is slidable relative to the second housing 60. The first board 10 of the keypad lifting mechanism 100 is fixed to the second housing 60, and the keypad 51 is fixed to the third board 40 of the keypad lifting mechanism 100. One end of the guiding piece 30 is fixed to the second housing 60 via the through hole 32 thereof.

When the first housing 50 is pushed away from the second housing 60, the guiding piece 30 is moved with the first housing 50. The guiding post 24 of the second board 20 slides along the guiding hole 33 of the guiding piece 30, and the guiding piece 30 moves relative to the second board 20. The keypad 51 fixed on the third board 40 is revealed. When the guiding post 24 reaches the transverse end portion 34 of the guiding hole 33, the second board 20 is moved relative to the third board 40 and the third board 40 is raised relative to the second board 20. Thus the keypad 51 fixed on the third board 40 is raised to be at a same level as a top surface of the second housing 60. The springs 56 are deformed.

When the first housing 50 is pushed toward the second housing 60, the guiding piece 30 is moved with the first housing 50. The guiding post 24 resists the guiding piece 30 in the transverse end portion 34 of the guiding hole 33, and the second board 20 is moved with the guiding piece 30. The wedges 42 of the third board 40 respectively move toward the protrusions 22 of the second board 20. Then, the springs 56 rebounding to original shapes force the slopes 44 to slide down along the protrusions 22 until being situated on level surface of the second board 20. Thus, the third board 40 with the keypad 51 is moved down. When the first housing 50 is further pushed away from the second housing 60, the second board 20 is stopped by the positioning posts 15 of the first board 10 and the guiding post 24 slide along the guiding hole 33. When the guiding post 24 reaches another end of the guiding hole 33, the keypad 51 is hidden by the first housing 50.

It is to be understood that the number of the locking module 50, the protrusions 22 and the wedges 42 may be increased or reduced.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad lifting mechanism comprising:
   a first board;
   a guiding piece defining a guiding hole, the guiding hole including a transverse end portion;
   a second board including at least one protrusion, a guiding post being formed on the second board for engaging in the guiding hole of the guiding piece; and
   a third board including at least one slope corresponding to the at least one protrusion, when the guiding piece being pushed away from the third board, the guiding post sliding along the guiding hole of the guiding piece, and the second board moving with the guiding piece when the guiding post reaching the transverse end portion of the guiding hole, the third board being raised by the at least one slope sliding up along the at least one protrusion of the second board.

2. The keypad lifting mechanism as claimed in claim 1, wherein the first board includes two guiding columns, and the guiding piece is positioned between and slides along the two guiding columns.

3. The keypad lifting mechanism as claimed in claim 2, wherein the first board further includes at least one positioning post, the second board defines at least one sliding hole allowing the at least one positioning post to extend through and slide along, and the third board defines at least one positioning hole engaging with the at least one positioning post.

4. The keypad lifting mechanism as claimed in claim 3, wherein each number of the at least one positioning post, the at least one sliding hole and the at least one positioning hole is three.

5. The keypad lifting mechanism as claimed in claim 2, further comprising at least one locking module, wherein the at least one locking module includes a sleeve, a spring and a locking member, the locking member includes a head and a shaft, the third board defines a second cutout for allowing the head to extend out, the sleeve is positioned on the first board, and the spring is mounted on the shaft with one end fixed to a bottom surface of the sleeve and another end fixed to the head.

6. The keypad lifting mechanism as claimed in claim 5, wherein the number of the at least one locking module is two, the locking modules are positioned at opposite edges of the keypad lifting mechanism.

7. The keypad lifting mechanism as claimed in claim 5, wherein the third board includes at least one wedge, and the at least one slope is one surface of the at least one wedge.

8. The keypad lifting mechanism as claimed in claim 2, wherein the guiding piece is curved in shape and has a swerving portion, and the guiding post is turned into the transverse end portion of the guiding hole when the swerving portion slides along the guiding columns.

9. A portable terminal comprising:
   a first housing;
   a second housing slidable relative to the first housing;
   a keypad lifting mechanism including:
      a first board fixing on the first housing;
      a guiding piece defining a guiding hole, the guiding hole including a transverse end portion, one end of the guiding piece being fixed to the first housing;
      a second board including at least one protrusion, a guiding post being formed on the second board for engaging in the guiding hole of the guiding piece; and
      a third board including at least one slope corresponding to the at least one protrusion;
   a keypad fixed on the third board of the keypad lifting mechanism, when the first housing being pushed away from the second housing, the guiding piece moving with the first housing, the second board moving with the guiding piece when the guiding post reaching the transverse end portion of the guiding hole, and the keypad of the third board being raised by the at least one slope sliding up along the at least one protrusion of the second board.

10. The portable terminal as claimed in claim 9, wherein the keypad lifting mechanism further comprises a first board, the first board is fixed to the second housing, the first board includes two guiding columns, and the guiding piece is positioned between and slides along the two guiding columns.

11. The portable terminal as claimed in claim 10, wherein the first board further includes at least one positioning post, the second board defines at least one sliding hole allowing the at least one positioning post to extend through and slide along, and the third board defines at least one positioning hole engaging with the at least one positioning post.

12. The portable terminal as claimed in claim 11, wherein each number of the at least one positioning post, the at least one sliding hole and the at least one positioning hole is three.

13. The portable terminal as claimed in claim 11, wherein the keypad lifting mechanism further comprises two locking modules at opposite edges thereof, the locking modules force the third board to move toward the second board.

14. The portable terminal as claimed in claim 13, wherein each locking module includes a head and a shaft, the third board defines a second cutout for allowing the head to extend out, the sleeve is positioned on the first board, and the spring is mounted on the shaft with one end fixed to a bottom surface of the sleeve and another end fixed to the head.

15. The portable terminal as claimed in claim 9, wherein the third board includes a plurality of wedges, and each slope is one surface of the wedge.

16. The keypad lifting mechanism as claimed in claim 10, wherein the guiding piece is curved in shape and has a swerving portion, and the guiding post is turned into the transverse end portion of the guiding hole when the swerving portion slides along the guiding columns.

17. A portable terminal comprising:
  a first housing including a first board;
  a second housing slidable relative to the first housing;
  a keypad lifting mechanism including:
    a guiding piece moved with the first housing;
    a second board including at least one protrusion; and
    a third board including at least one slope corresponding to the at least one protrusion, the at least one slope sliding along the at least one protrusion when the second board being moved by the guiding piece;
  a keypad fixed on the third board of the keypad lifting mechanism, the keypad being moved up or down by the keypad lifting mechanism when the first housing sliding relative to the second housing.

18. The portable terminal as claimed in claim 17, wherein the guiding piece defines a guiding hole, the guiding hole includes a transverse end portion, the second board includes a guiding post, the guiding post is slidable engaged in the guiding hole, and the second board is moved with the guiding piece when the guiding post is in the transverse end portion of the guiding hole.

19. The portable terminal as claimed in claim 18, wherein the first board includes two guiding columns, the guiding piece is positioned between and slides along the two guiding columns, the guiding piece is curved in shape and has a swerving portion, and the guiding post is turned into the transverse end portion of the guiding hole when the swerving portion slides along the guiding columns.

20. The portable terminal as claimed in claim 17, wherein the keypad lifting mechanism further comprises two locking module positioned at two sides thereof, each locking module includes a head and a shaft, the third board defines a second cutout for allowing the head to extend out, the sleeve is positioned on the first board, and the spring is mounted on the shaft with one end fixed to a bottom surface of the sleeve and another end fixed to the head.

* * * * *